(12) United States Patent
Kawamura et al.

(10) Patent No.: US 6,408,133 B1
(45) Date of Patent: Jun. 18, 2002

(54) FINDER SYSTEM IN PHOTOGRAPHING APPARATUS

(75) Inventors: Fuminori Kawamura, Kanagawa-Ken; Masaaki Sakaguchi, Tokyo; Hiroshi Sakata, Kanagawa-Ken, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/563,512

(22) Filed: May 3, 2000

(30) Foreign Application Priority Data

May 6, 1999 (JP) .......................... 11-126282
May 31, 1999 (JP) .......................... 11-151238

(51) Int. Cl.$^7$ .......................... G03B 17/02; G03B 13/02
(52) U.S. Cl. .......................... 396/6; 396/72; 396/376; 396/385
(58) Field of Search .......................... 396/72, 76, 164, 396/336, 376, 385, 6, 89

(56) References Cited

U.S. PATENT DOCUMENTS

| 1,992,068 A | 2/1935 | Gwozdecki | |
|---|---|---|---|
| 4,560,261 A | * 12/1985 | Ueda et al. | 396/336 |
| 5,541,686 A | * 7/1996 | Stephenson | 396/164 |
| 5,619,295 A | 4/1997 | Seya et al. | |
| 5,721,995 A | * 2/1998 | Katsura et al. | 396/351 |

FOREIGN PATENT DOCUMENTS

| BR | PI9303575-6 A | 5/1995 |
|---|---|---|
| JP | 559511 | 1/1980 |
| JP | 9133958 | 5/1997 |
| JP | 10200834 | 7/1998 |

* cited by examiner

Primary Examiner—Russell Adams
Assistant Examiner—Arthur A. Smith
(74) Attorney, Agent, or Firm—Young & Thompson

(57) ABSTRACT

A focusing position selecting mechanism for determining focusing positions of a taking lens is provided with a selector member for selecting among a plurality of focusing positions including a focusing position for close-up photographing. In the front portion of the photographing unit a mirror is provided fixedly beside a finder window, and the photographer can take a picture of an object from the front with himself included in the composition by watching the mirror. On the front portion of the apparatus is indicated a focusing state of normal photographing so that the photographer may not make a mistake in photographing from the front at the normal focusing position.

11 Claims, 15 Drawing Sheets

FINDER SYSTEM IN PHOTOGRAPHING APPARATUS

FIELD OF THE INVENTION

This invention relates to photographing apparatuses such as lens-fitted film units and photo cameras of simple structures. More particularly, this invention relates to a photographing apparatus provided with a focusing position selecting mechanism which allows the photographer to set selectively two or more focusing points of a taking lens when taking a photo. Further more particularly, this invention relates to a finder mechanism which is suitable for application to products of simple structures provided with photographing functions, for example, such as lens-fitted film units and photo cameras of simple structures.

BACKGROUND OF THE INVENTION

A lens-fitted film unit, which includes a photographing mechanism containing a taking lens and a shutter with an unexposed film roll previously loaded in the main body in the process of manufacture, is published, for example, in Japanese registered utility model publication No.2,564,847. This lens-fitted film unit is so constituted as to wind up the exposed film into the cartridge each time a picture is taken, and so the user buys the unit and takes the unit itself to a photo developing shop to have it developed after the film roll has been finished. Therefore, the unit has gained wide market acceptance as a convenient and functional photographing product. This lens-fitted film unit generally uses a single lens or two-piece lens structure in order to simplify the structure and bring down the cost of manufacture. This taking lens is fixed to the main body and focused on one particular focusing position. Therefore, the out-of-focus condition must be avoided by making the depth of field of the taking lens greater for objects which are not at the focused distance. However, various kinds of lens-fitted film units have recently been developed in respect to picture sizes and focal lengths of the taking lens, and so multifunctional products are much sought after.

In such diversified lens-fitted film units, it is required to properly set focusing positions in the process of manufacture in case it uses a long-focus taking lens, and so it is necessary to adopt a variety of schemes for the lens-focusing mechanism. For example, in the publication of Japanese laid-open patent publication Hei7-261069, a mechanism furnished with such a focusing mechanism as to focus a taking lens precisely and fix it to the setting position in the process of manufacture of a lens-fitted film unit furnished with a telephotographic lens, is disclosed. However, even in such a lens-fitted film unit, it is not possible to shift the focusing position to a plurality of focusing positions because the lens is fixed to the predetermined position. Taking such situations into consideration, it is preferred that lens-fitted film units and other cameras of simple structures can be applied to a plurality of different photographing situations such as normal photographing, and photographing of distant objects, and that they can take pictures properly focused while using a single taking lens or a two-piece-lens structure. A lens-fitted film unit, which is constituted to be able to take close-up photos in the proximity of within 60 cm with a reflex finder capable of moving in and out to allow the photographer to confirm the field and take photos of himself included in the field, is also suggested in the publication of Japanese laid-open patent publication Hei10-200834. The lens-fitted film unit disclosed in the publication can not be applied to a plurality of situations such as close-up photographing, normal photographing, and photographing of distant objects because the lens-fitted film unit does not have a plurality of focusing positions.

SUMMARY OF THE INVENTION

It is an object of this invention to provide photographing apparatuses such as lens-fitted film units and other cameras of simple structures which can be applied to a plurality of situations such as close-up photographing, normal photographing, and photographing of distant objects, and which have a viewfinder permitting the photographer to observe the photographing field and take photos of himself included in the field at the time of close-up photographing.

In order to solve the previously described problem, the lens-fitted film unit according to this invention includes a photographing mechanism provided in the main body and having a shutter, the body being formed with a film cartridge chamber for storing a cartridge having a rotatable spool shaft retaining one end of a photo film, and a film roll chamber for loading a roll of an unexposed film drawn out from the cartridge in the cartridge chamber; the cartridge and the roll of the unexpected film being loaded during manufacture of the unit respectively in the cartridge chamber and the film roll chamber whereby each time a photo is taken, a spool is rotated to take up the exposed film into the cartridge, a selector member being provided for selectively changing a focusing position of a taking lens between a predetermined normal photographing position and a close-up photographing position. In an alternative structure, a lens-fitted film unit may include a cylindrical lens holding member fixed to a unit body and a lens frame having a taking lens fitted thereto and disposed in the cylindrical lens holding member for rotation and movement along an optical axis, a cam mechanism being located between the cylindrical lens holding member and the lens frame, a selector member provided in the unit body for movement between a predetermined normal photographing position and a close-up photographing position for causing the lens frame to rotate to thereby produce in the lens frame a movement through the action of the cam in the direction of the optical axis. According to a feature of this invention, a photographing viewfinder is provided in the lens-fitted film unit, and the photographing finder may be provided with a reflective mirror which allows to observe a photographing field from the front of the unit when performing close-up photographing.

In the lens-fitted film unit according to this invention, by handling the selector member, the focusing position of the taking lens can be determined at, for example, 4 m position, and 60 cm position. In another mode, the arrangement may be such that the taking lens can be focused at either of the three positions including, for example, the infinitely far position, 4 m position, and 60 cm position. And it is possible to include the photographer himself in the photographing area by observing the photographing field from the front portion of the reflective mirror when selecting the 60 cm position for close-up photographing.

In the lens-fitted film unit of this invention, the selector member may be formed integral therewith a mirror shield, which may be retracted from position in front of the reflective mirror when the selector member is at the close-up position permitting to observe the photographing field by the reflective mirror, and the mirror shield, may be held in a position for shielding the reflective mirror when the selector member is at the normal photographing position making it impossible to observe the photographing field through the mirror. In another mode of this invention, the selector lever may be integrally provided with a close-up field frame which is moved to a position overlapping the photographing field finder when the selector member is in the close-up photographing position for compensating the parallax between the taking lens and the finder field, the close-up field frame being positioned to overlap the front face of the reflective mirror when the selector is at the normal photographing position to indicate at the front of the unit that the unit is in the normal photographing position. In another mode of the present invention, an indicator mark may be provided to interact with the movement of the selector member to be located in front of the reflective mirror when the selector member is in the normal photographing position to indicate at the front of the unit that the unit is in the normal photographing position. In the lens-fitted film unit of the present invention, the main body may be provided on the front side thereof with a light emitting portion, and the selector member may be formed integral therewith a light-shielding member which covers at least partly the front side of the light emitting portion for restricting the quantity of the light from the light emitting portion. This light-shielding member can be constituted to cover at least part of the reflective mirror in the normal photographing position.

Further, this invention provides a photo camera comprising a photographing mechanism including a taking lens of a fixed focal length and a shutter mechanism, a selector member for moving the taking lens to one of a plurality of focusing positions including a close-up photographing position and a normal photographing position and a reflecting mirror fixedly provided adjacent to, for example, at a side of photographing field finder for making it possible to observe the photographing field from the front side of the camera. In one mode of the photo camera, the selector member may be formed integral therewith a mirror shield which is adapted to be retracted from the reflecting mirror when the selector member is at the close-up photographing position, to make it possible to observe the photographing field, and to cover the mirror when the selector member is at the normal photographing position to thereby shield the reflective mirror preventing the reflective mirror from being used to observe the photographing field through the reflective mirror.

In this photo camera, a close-up field frame may also be provided integrally with the selector member so that it compensates the parallax between the taking lens and the finder field by being placed over the front portion of the photographing field finder when the selector member is in the close-up photographing position, and adapted to indicate at the front portion of the unit that the camera is in the normal photographing position by being placed over the front portion of the reflective mirror when the selector is at the normal photographing position. In another mode, an indication mark is provided on the front portion of the reflective mirror to indicate, in response to the movement of the selector member, on the front portion of the unit that the camera is in the normal photographing position when the selector member is located at the normal photographing position. A light-shielding member may also be provided integrally with the selector member to limit the amount of light from the light emitting portion by being placed over at least part of the light emitting portion when the selector member is in the close-up photographing position. The light-shielding member can be so formed that the light-limiting member shields at least part of the mirror.

In another embodiment of this invention, a lens-fitted film unit includes a photographing mechanism including a shutter in the main body, the body-bing formed with a cartridge chamber for storing a cartridge having a rotatable spool shaft retaining one end of a photo film, and a roll film chamber for storing a roll of unexposed film drawn out from the cartridge, a cartridge and a roll of unexpected film drawn out from the cartridge being loaded during manufacture in the cartridge chamber and the film roll chamber respectively, whereby each time a photo is taken, the spool shaft is rotated to wind the film up into the cartridge, a selector member being provided to selectively locate the focusing position at either the normal photographing position or the close-up photographing position. Alternatively, the body of the lens-fitted film unit may have a cylindrical lens holding member secured thereto, a lens frame having a taking lens fixed thereto and disposed in the cylindrical lens holding member for rotation and movement along the optical axis, a cam mechanism provided between the lens holding member and the lens frame, and a selector member provided in the body for movement between a predetermined normal photographing position and a close-up photographing position to cause the lens frame to rotate to thereby produce a movement of the lens frame in the direction of the optical axis through the action of the cam mechanism. According to the feature of the invention, in the lens-fitted film unit, a photographing field finder is provided, and in the front of the field finder a translucent member is located in such a way that an object can be observed through the finder. When the selector member is at the close-up photographing position, the light-shielding portion serves to decrease the brightness of the background of the translucent member, so that an apparent reflection of the translucent member is increased to make it possible to observe the photographing field from the front portion of the unit.

The translucent member located in front of the photographing viewfinder, has such translucence that an object can be observed through the finder from the back side of the unit at the normal photographing position. In a preferred mode of this invention, this translucent member is a half-mirror made of a transparent material having a reflective material vapor deposited thereon. The half-mirror is preferably of relatively low reflectance for the purpose of the invention, so that the ratio of reflectance to translucence is to be 0:10 or 5:5. Reflectance 0 means that the translucent material is supposed to be transparent, but even in such a case insertion of a light-shielding member into the back of the translucent member may cause the translucent member to produce reflection, permitting the photographing field to be observed from the front side of the unit.

In another aspect of the invention, the selector member is provided integrally with a close-up field frame which is adapted to be placed over the photographing filed finder for indicating the area of close-up photographing and compensate the parallax between the filed of the taking lens and the finder field when the selector member is at the close-up photographing position, and the light-shielding member is placed on this close-up frame. Further, in the lens-fitted film unit according to this invention, a light emitting portion may be placed in the front portion of the main body. The selector member may be formed integrally with the light-shielding member which functions to restrict the light from the stroboscope by shielding at least part of the front portion of the light emitting portion. This light-shielding member can be so constituted as to shield at least part of the reflective mirror.

Further, the present invention provides a photo camera furnished with a fixed focus taking lens, a photographing mechanism including a shutter mechanism, and a selector member which selects among a plurality of focal positions including the close-up photographing position and the normal photographing position. In this camera a field finder can also be constituted similar to a lens-fitted film unit.

DETAILED DESCRIPTION OF THE PREFFERED EMBODIMENTS

Figure 1:
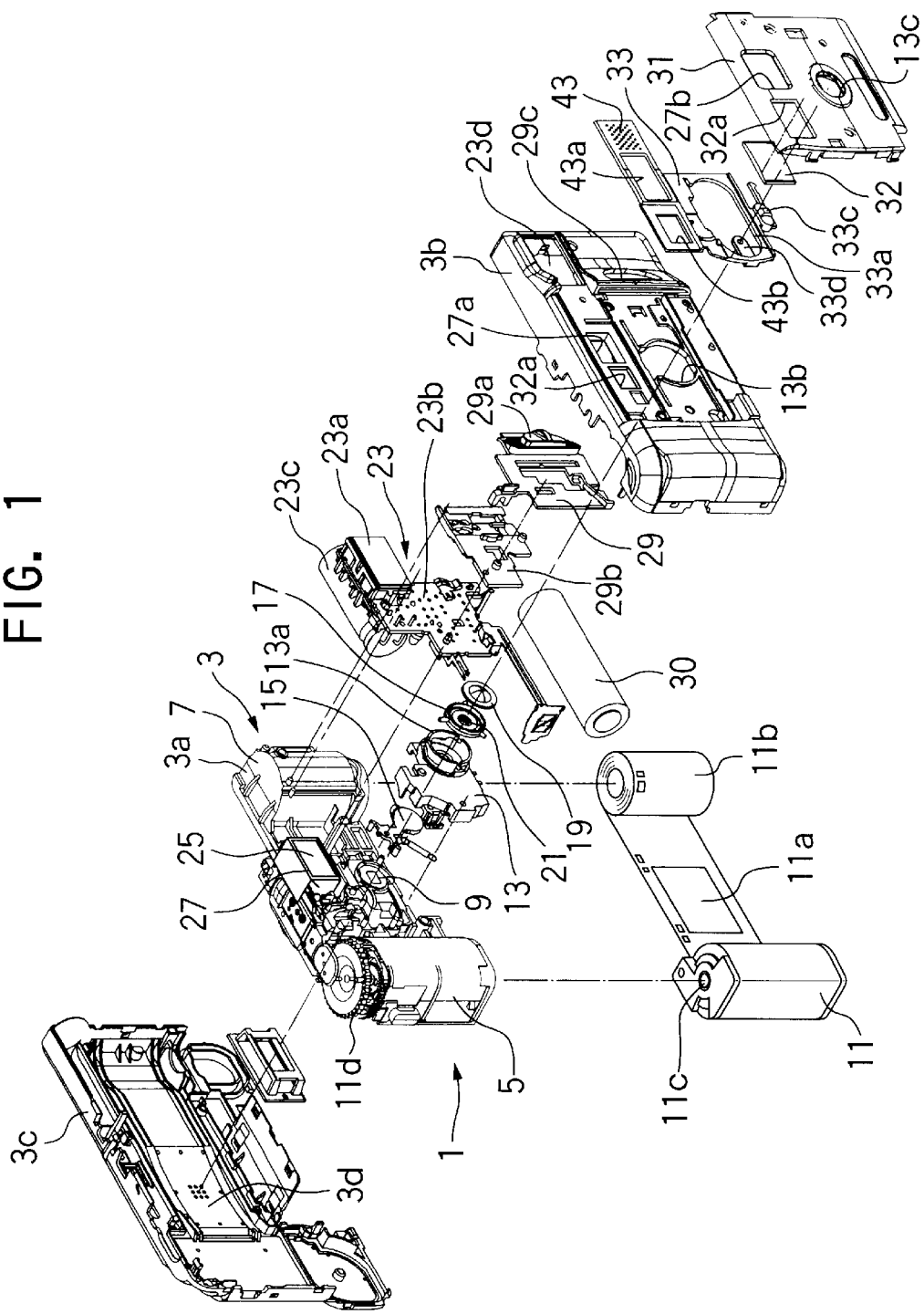
FIG. 1 is an exploded perspective of a lens-fitted film unit according to an embodiment of this invention.
Figure 2:
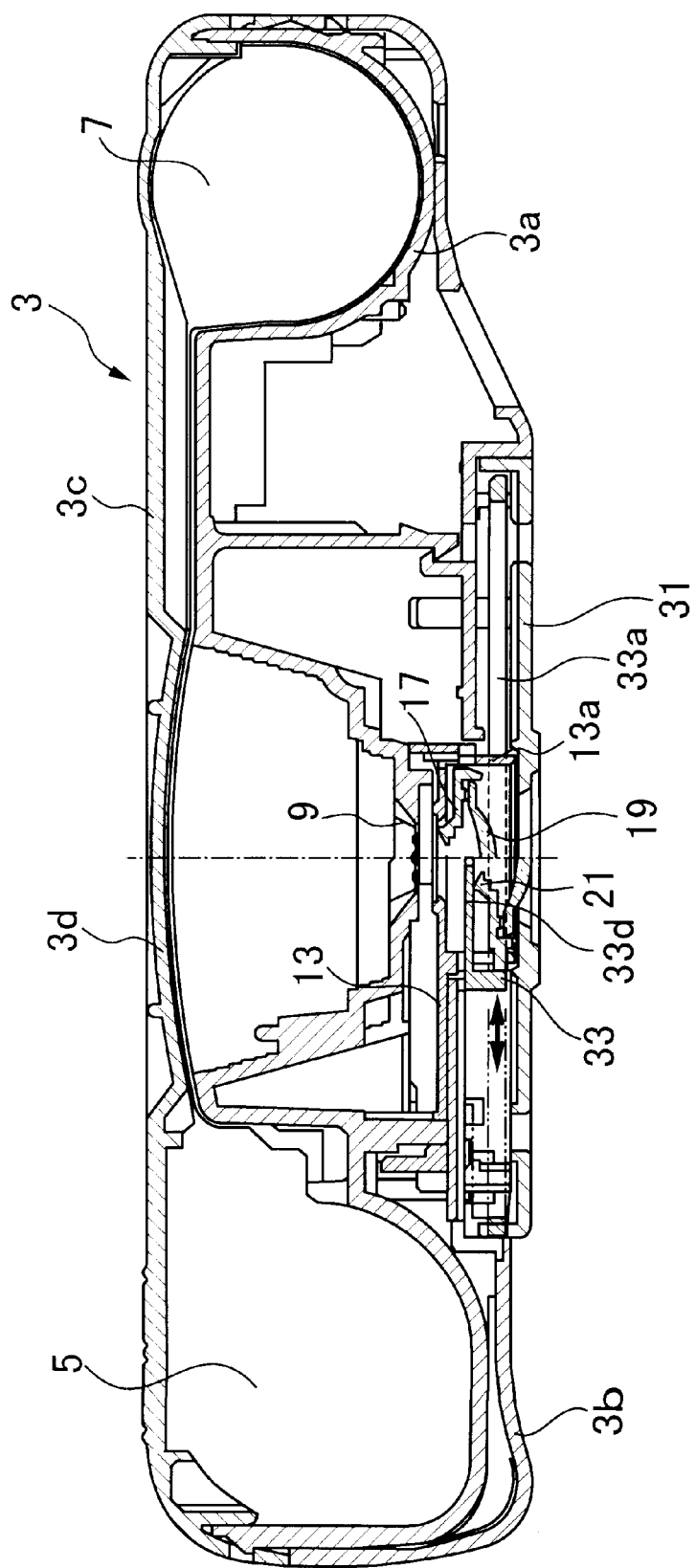
FIG. 2 is a horizontal sectional view of the lens-fitted film unit shown in FIG. 1.

FIG. 1 is an exploded perspective view showing a lens-fitted film unit according to an embodiment of this invention. The lens-fitted film unit 1 is provided with the main body 3 consisting of the base portion 3a, the front cover 3b, and the rear cover 3c. As shown in FIG. 2, a film cartridge chamber 5 and a film roll chamber 7 are formed at both ends between the base portion 3a and the rear cover 3c. In the midsection of the main body 3a, there is formed an exposure aperture 9. In the process of manufacture of a lens-fitted film unit 1, a photo film loaded in the cartridge 11 is prepared, and the unexposed film 11a is drawn out from the cartridge 11 to form a film roll 11b. The leading end of the unexposed film 11a on the side of the cartridge is fixed to a spool shaft 11c rotatably placed in the cartridge 11.

The cartridge 11 is held in the cartridge chamber 5, and the film roll 11b is held in the film roll chamber 7. After that, the rear cover 3c is mounted on the back of the base portion 3a and is then fixed light-tightly. In another embodiment, a take-up spool shaft (not illustrated) is provided in the film roll chamber 7, and after the film cartridge 11 is loaded into the cartridge chamber 5, the leading end of the film 11 is put to the take-up spool shaft, and the rear cover is closed, after the main body 3 has been assembled, and the unexposed film 11a is drawn out from the film cartridge 11a and wound up by rotating the take-up spool shaft into a roll form. A film receiving portion 3d is provided on the inner surface of the rear cover 3c at a location corresponding to the back side of the exposure aperture 9 and the unexposed film 11a located between the cartridge 11a and the film roll 11b is retained between the film support 3e formed on the back surface of the base portion 3a and the film receiving portion 3d.

A lens holder 13 with a cylindrical lens holding member 13a is secured to the front surface of the base portion 3a. The cylindrical lens holding member 13a is placed coaxially with the exposure aperture 9 formed in the base portion 3a. A sector blade 15 consisting of the shutter mechanism is located between the lens holder and the base portion 3a. This shutter mechanism including this sector blade 15 is charged by the action of winding up of the film 11a, and is released by pushing the shutter release button mounted on the upper portion of the main body 3. Since this shutter mechanism and its actuation are known in the art of the lens-fitted film unit, detailed explanation is omitted. In order to wind up the film into the cartridge 11a, a taking-up knob 11d is rotatably provided on the upper portion of the base portion 3a, and this taking-up knob 11d is coupled to the spool shaft 11c.

The cylindrical lens holding member 13a is cylindrical-shaped and formed of plastics integrally with the lens holder 13. In the cylindrical lens holding member 13a a lens frame 17 is placed movable in the rotational and coaxial directions. The taking lens 19 is fixed to the lens frame 17. This taking lens 19 is a single fixed focal lens or a two-piece fixed focal lens. A first fixed aperture 21 is provided in the lens frame 17 at the rear of the taking lens 19. In this example, the taking lens 19 is a standard focal length lens of about 30 mm equivalent to a 135 film, and the fixed aperture 21 has a f number of about F 10 for normal photographing.

The illustrated mode of lens-fitted film unit is a form with a built-in stroboscope. The stroboscope 23 consists of a light emitting portion 23a, a printed circuit 23b with a light emission control circuit and a charging capacitor 23c. The light emitting portion 23a and the charging capacitor 23c are supported on the printed circuit board 23b. In the base portion a finder window 27 fitted with a finder objective lens 25 is formed above the exposure aperture 9, and the light emitting portion 23a is placed on the right side of the finder window 27 and the printed circuit 23b is secured to the base portion 3a with respect to the base portion 3a seen from frontward.

A stroboscope charging switch board 29 is provided in the front portion of the printed circuit board of the stroboscope 23b. The switch board 29 is mounted on the printed circuit board 23b via the switch base 29b. The switch board 29 which is provided integrally with a charging switch knob 29a can slide upward and downward, and by placing this switch knob at the charging position, the main capacitor 23c for the flash unit 23 is charged. The battery 30 for charging the capacitor is mounted on the lower portion of the base portion 3 shown in FIG. 3 as known in the art of the lens-fitted film unit.

Figure 3:
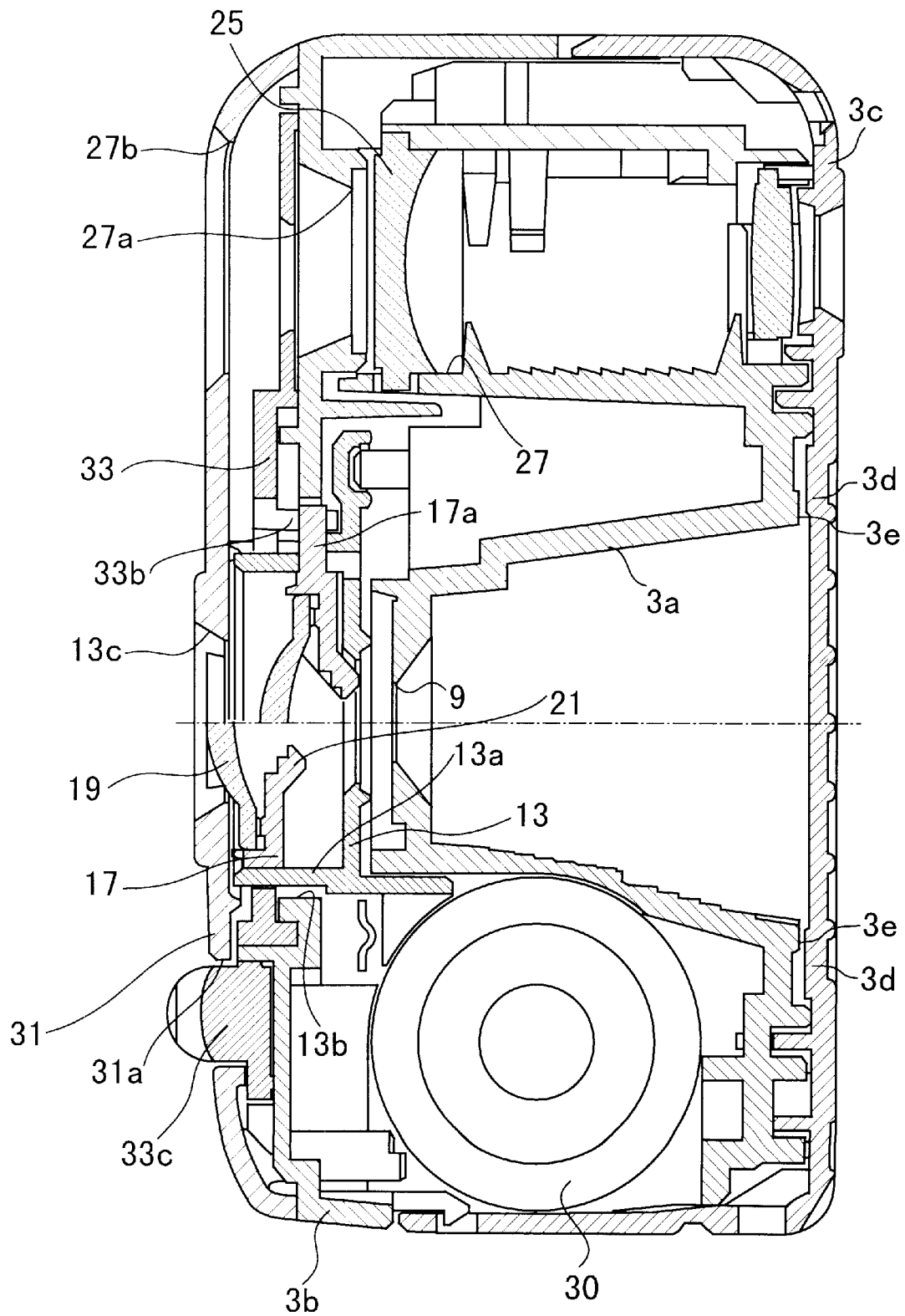
FIG. 3 is a vertical sectional view of the lens-fitted film unit shown in FIG. 1.

A front cover 3b is mounted on the front part of the base portion 3a. The front cover 3b, which is so formed as to shield almost all the front part of the base portion 3a, includes a finder window 27a corresponding to the finder window 27 of the base portion 3a, a stroboscope window 23d to expose the light emitting portion 23a frontward, the charging switch aperture 29c to expose the switch knob 29a on the switch board 29 frontward of the base portion 3 within its stroke, and a lens aperture 13b to pass the cylindrical lens holding member 13a of the lens holder 13. A reflective mirror 32, which is mounted on the front of the front cover 3b in parallel with the finder window 27a, serves as a finder to observe the photographing field from the front in the case of performing close-up photographing. As shown in FIG. 2 and 3, the cylindrical lens holding member 13a extends frontward through the lens aperture 13b of the front cover 3b.

Figure 4:
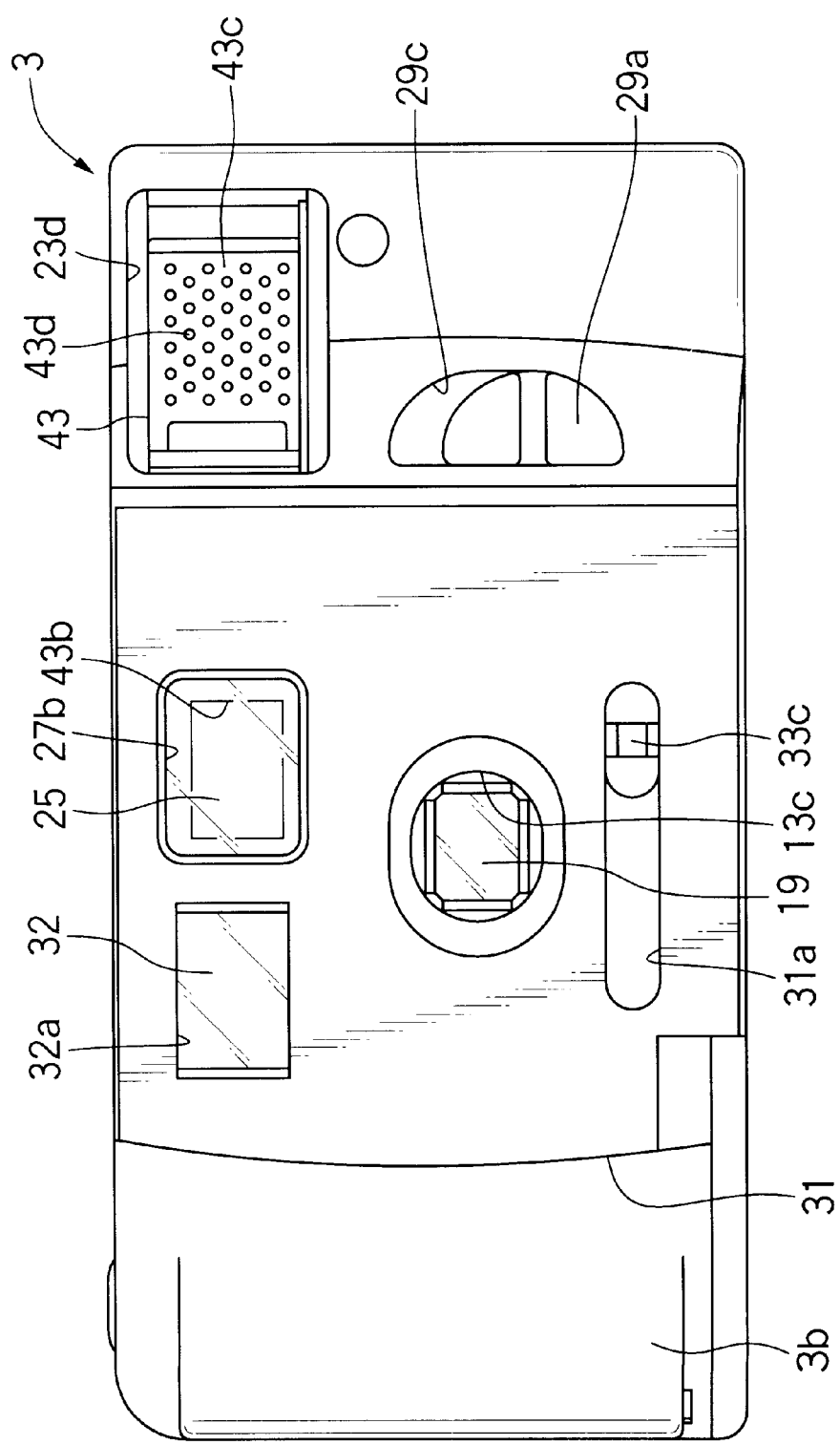
FIG. 4 is a front view of the lens-fitted film unit in the state of close-up photographing.

An outer cover 31 is mounted on the front portion of the front cover 3b. In the outer cover 31 is formed the finder window 27b at the corresponding position to the finder 27a of the front cover 3b, and the window 32a to expose the reflective mirror 32 is formed at the location corresponding to the reflective mirror 32. The outer cover 31 also includes a lens aperture 13c connecting to the front end of the cylindrical lens holding member 13a in order to pass the photographing light. The selector member 33 which can shift sideward is provided between the outer cover 31 and the front cover 3b. FIG. 4 is an external front view of the lens-fitted film unit according to this embodiment. As shown in FIG. 4, the reflective mirror 32 is provided on the left of the finder window 27 facing the lens-fitted film unit 27, that is, on the right side of the lens-fitted film unit facing the objective.

Figure 5:
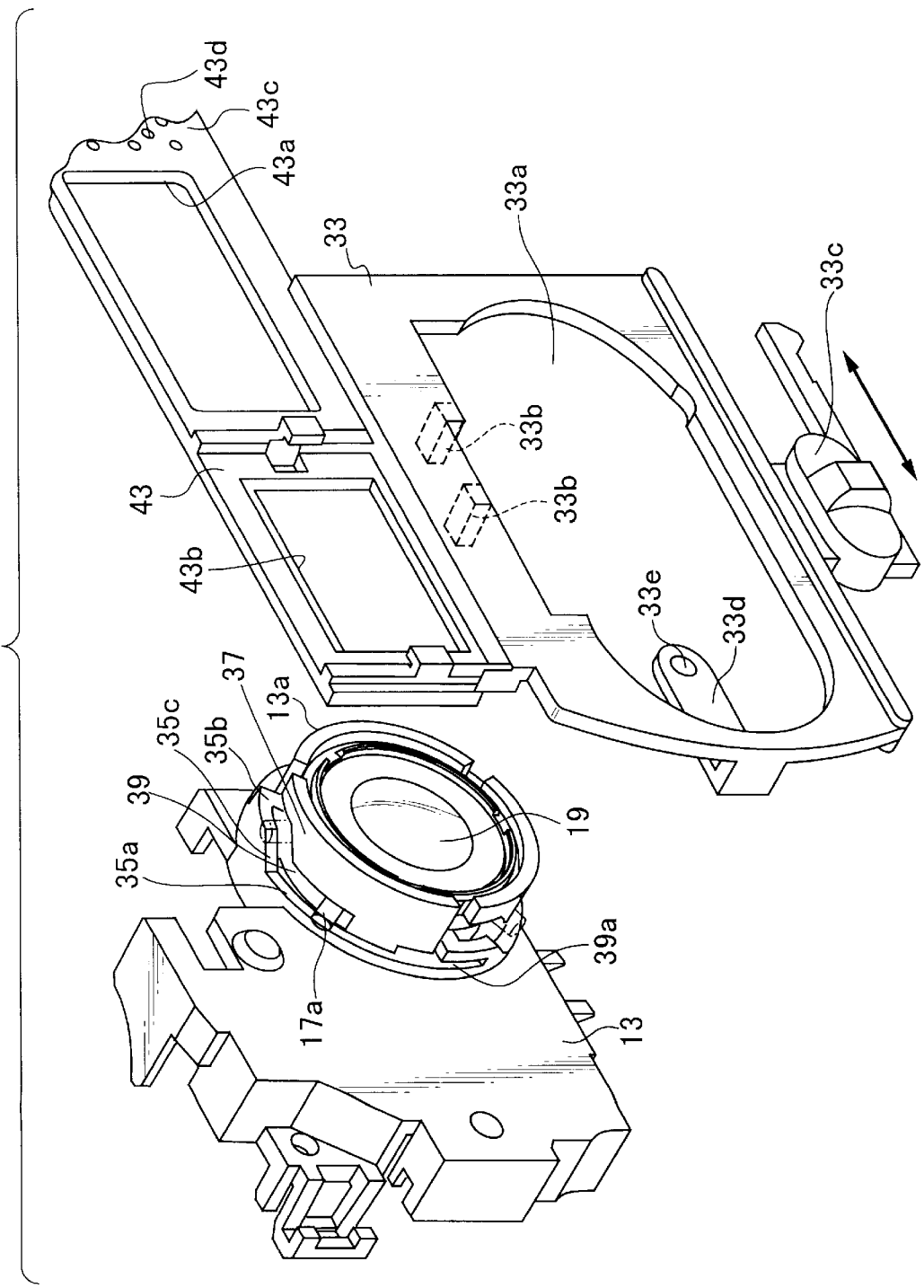
FIG. 5 is an exploded perspective illustrating the focus position selective mechanism according to an embodiment of the invention.
Figure 6:
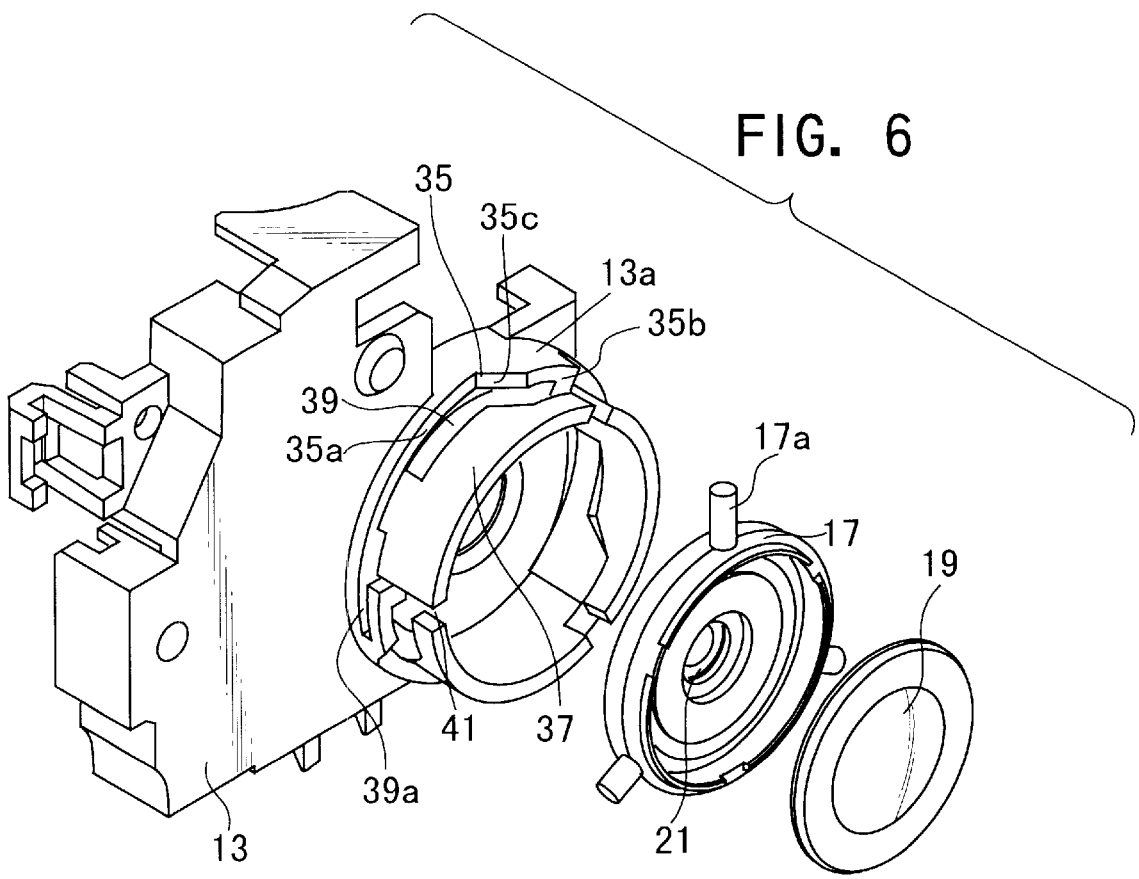
FIG. 6 is an exploded perspective of the arrangement of a selector member in the focus position selective mechanism according to an embodiment of the present invention.

In FIG. 5 and 6 are illustrated details of the focusing selector mechanism of the taking lens. The cylindrical lens holding member 13a which extends forward from the lens holder 13, includes a cam surface 35 facing forward. In the illustrated mode, this cam surface 35 consists of a first surface 35a to determine the retracting position of the lens 19, the second surface 35b to determine the projecting position of the lens 19, and the slanting surface 35c to connect the first surface 35a with the second surface 35b. On the front of the cam surface 35 is formed the retaining member 37 at a stated interval from the cam surface 35. Therefore, the cam grooves are formed between the cam surface 35 and the retaining member 37. The cam grooves 39 are formed at a plurality of places (e.g., three places) spaced at regular intervals on the periphery of the cylindrical lens holding member 13a. A groove of a stated width 41 is formed in the direction of the optical axis between one end of the retaining member 37 consisting of one groove 39 on the periphery and an adjacent end of the retaining member 37.

Cam follower pins 17a are provided at a plurality of places (e.g., three pins spaced at regular intervals on the periphery ) in the lens frame 17 protruding in the outward direction of the radius. These follower pins 17a are inserted into the cam grooves 39 through the grooves 41. The retaining member 37 of the cylindrical lens holding member 13a is elastic, pressing the cam follower pins 17a against the cam surface 35 elastically. In FIG. 5 is shown the state of a cam follower pin 17a engaged with a cam groove 39.

As shown in FIG. 5, the selector member 33 is constituted as a frame member with an oblong aperture 33a in the middle. The selector member 33 is placed between the outer cover 31 and the front cover 3b in the state of being inserted into the aperture 33a. The selector member 33 has a pair of lens driving pins 33b protruding backward, with cam follower pins 17a on the lens frame 17 sandwiched between these lens driving pins 33b. In the lower portion of the selector 33 is formed a selector knob 33c protruding frontward from the slit 31a formed on the outer cover 31 as shown in FIG. 4. Therefore, the selector member 33 can be shifted horizontally by handling this selector knob 33c. When the selector member 33 is shifted horizontally, the lens driving pins 33b rotate the lens frame 13a in engagement with the cam follower pins 17a on the lens frame 13a. Rotation of this lens frame 13a actuates the cam follower pin 17a to slide on the cam surface 35, and the lens frame 13a is shifted in the direction of the optical axis by the action of the cam.

When the selector member 33 is set on the right side facing the object, the cam follower pin 17a comes into engagement with the first surface of the cam surface 35, and when the cam follower pin 17a is placed at this position, the lens frame 13a and the taking lens 19 are placed in the rear, and the taking lens is focused, for example, on a distance of 4 m for normal photographing. Reversely, when the selector member 33 is set on the left side facing the object and the cam follower pin 17a is placed on the second surface 35b of the cam surface 35, the lens frame 13a and the taking lens 19 are advanced to a frontward position to be focused for close-up photographing, for example, at a focal point of 60 cm.

As shown in FIG. 5, on the right side facing the object is formed an aperture arm 33d extending sideward on the aperture 33a, and the second aperture 33e is formed at the tip of this aperture arm 33d. The second aperture 33e has an aperture smaller than the first aperture 21 mounted on the lens frame 17. When the selector member 33 is shifted to the left facing the object, and the taking lens is protruded frontward, the aperture arm 33d of the selector member 33 is inserted into a rear position of the taking lens 19 through the slit 39a formed in the cylindrical lens holding member 13a. In this situation the second aperture 33e placed at the tip of the aperture arm 33d is located on the optical axis of the taking lens 19. Therefore, the aperture for photographing becomes smaller than the first aperture, and the depth of focus becomes greater. As a result, the out of focus condition is avoided at the time of close-up photographing.

In the illustrated embodiment of this invention, as shown in FIGS. 1 and 5, the finder frame 43 is formed integrally with the selector member 33 in the upper portion. The finder frame 43 has an aperture 43a which is located sideways approximately in the middle at a position overlapping the finder window 27 of the main body, when the selector member 33 is located on the right side facing the object for normal photographing. On the right side of the aperture 43a facing the object, a close-up field frame 43b is formed to indicate the photographing field for close-up photographing. As shown in FIGS. 1 and 4, a plurality of pinholes 43d are formed in the light-shielding member 43c on the other side of the close-up field frame 43b with the aperture 43a in-between. This finder frame 43 shifts sideways along the front surface of the front cover 3b between the front cover 3b of the main body and the outer cover 31 as the selector member 33 shifts sideways.

Figure 7:
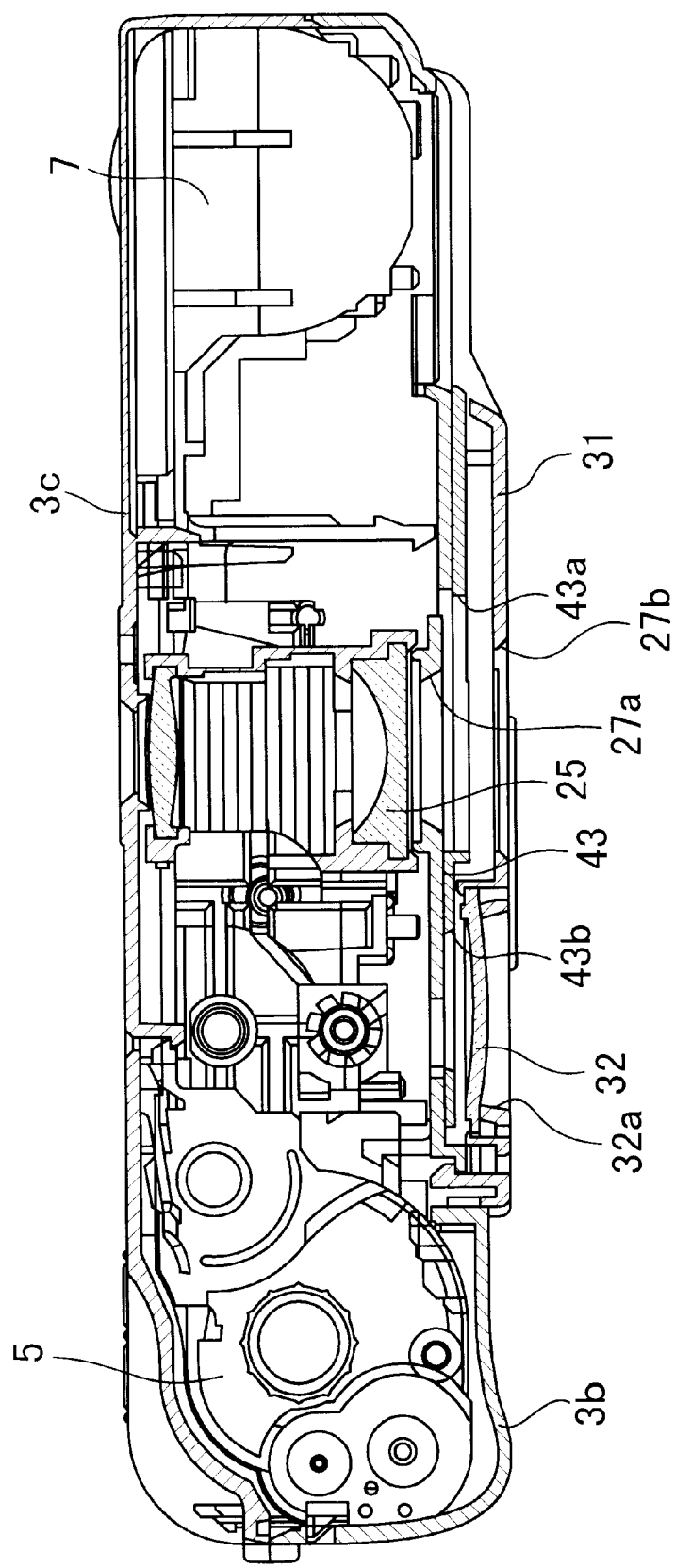
FIG. 7 is a horizontal sectional view of the finder mechanism according to an embodiment of the invention.
Figure 8:
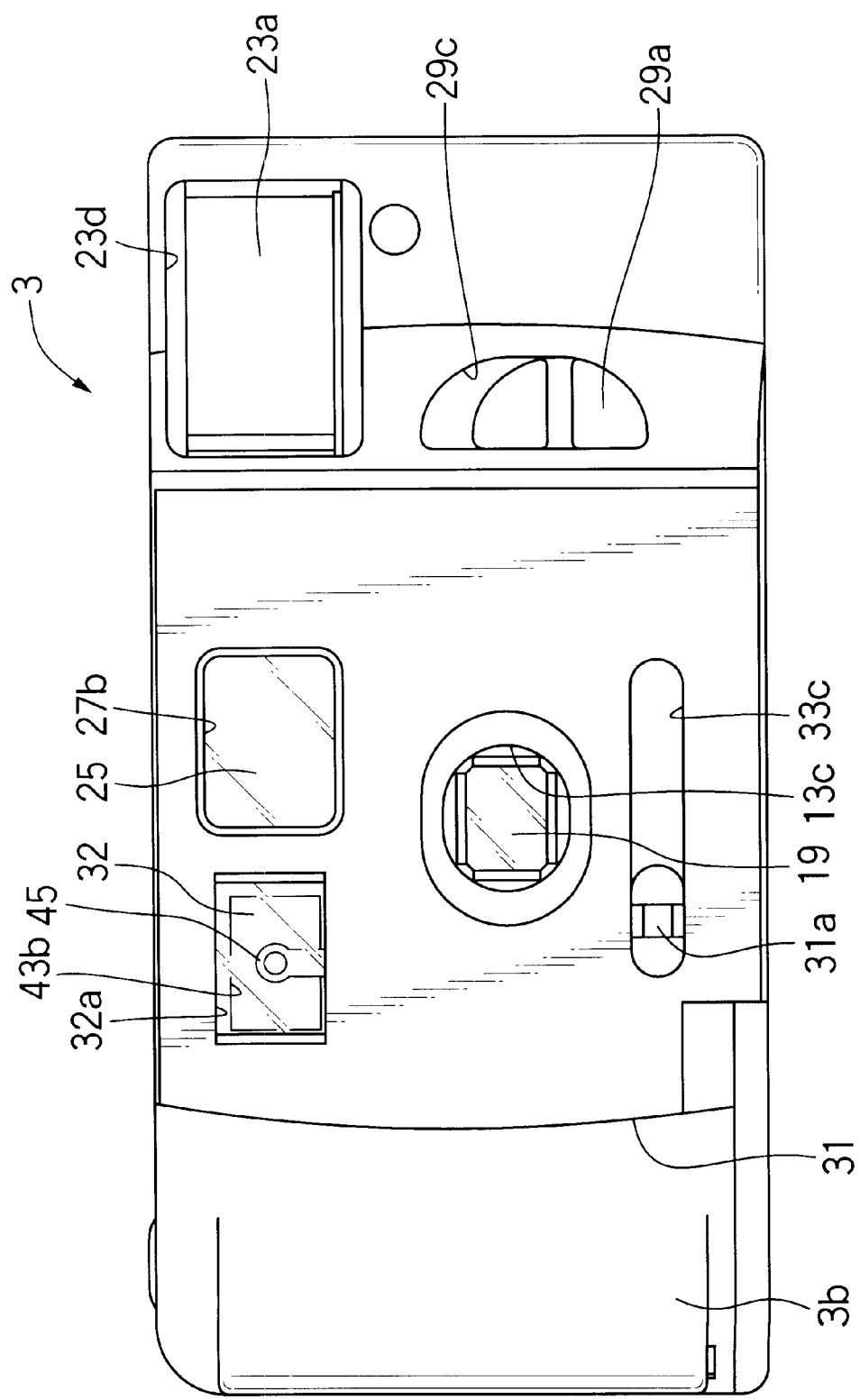
FIG. 8 is a front view of the lens-fitted film unit shown in FIG. 1 in the state of normal photographing.

FIG. 7 is a horizontal sectional view of the layout of the finder frame 43 when the selector member 33 is set at the position for normal photographing, and FIG. 8 is its front view. The aperture 43a of the finder frame 43 overlaps the finder window 27a of the front cover 3b, allowing the photographer to determine the composition by observing the object through the objective lens for the finder 25. In this situation the light-shielding member 43c of the finder frame 43 is located between the light emitting portion 23a and the finder window 27, and the light emitting portion 23a is in the state of being wholly exposed frontward. The close-up field frame 43b of the finder frame 43 is located at a position overlapping the reflective mirror 32. Therefore, if the photographer tries to take a close-up self-portrait with himself included in the photographing range in front of the lens-fitted film unit, the photographer can recognize that the focusing of the taking lens 19 is at normal photographing, and that it is improper for intended close-up photographing because the mirror 32 to determine the close-up field is partly hidden by the close-up field frame 43b as shown in FIG. 8.

If the selector member is shifted leftward facing the object, the taking lens 19 protrudes frontward to be focused for close-up photographing, and at the same time the finder frame 43 shifts in the same direction, leading to the state shown in FIG. 4. At this position, the close-up field frame 43b is located in the finder window 27b, and so the photographer can confirm the photographing range for close-up photographing via the close-up field frame 43b. Further, at this close-up photographing position, the light-shielding member 43c formed in the finder frame 43 is located in the front portion of the stroboscope window 23d of the front cover 3b, shielding the light emitting portion 23a, the light from the stroboscope is projected forward only through the pinholes of the light-shielding member 43c, and the amount of light from the light emitting portion is limited. Therefore, this constitution can avoid over-exposure at the time of close-up photographing. In this embodiment the target mark 45 may be provided in the close-up field 43b to serve as a target for close-up photographing.

Figure 9:
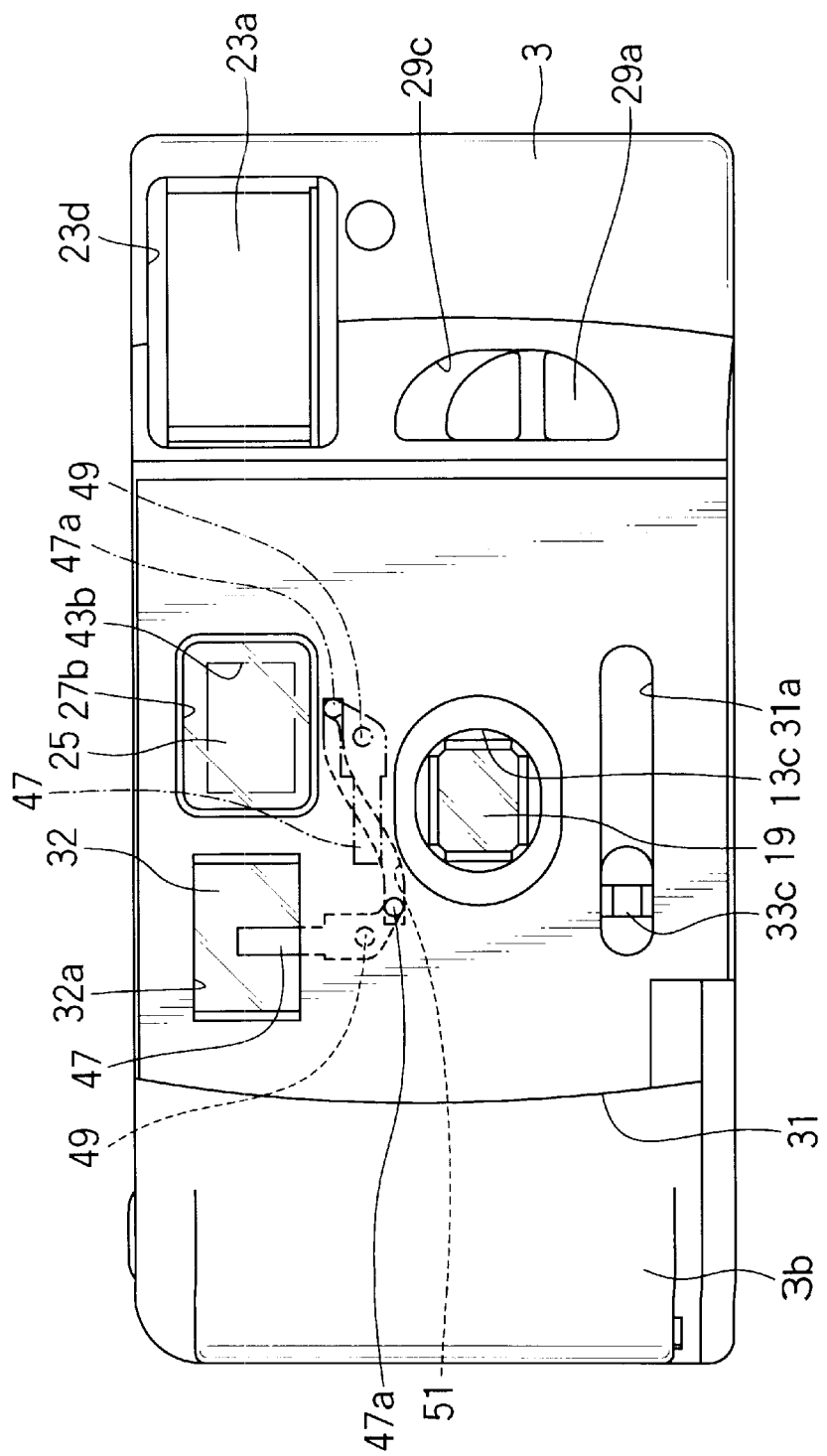
FIG. 9 is a front view similar to FIG. 8 of another embodiment of the invention.
Figure 10:
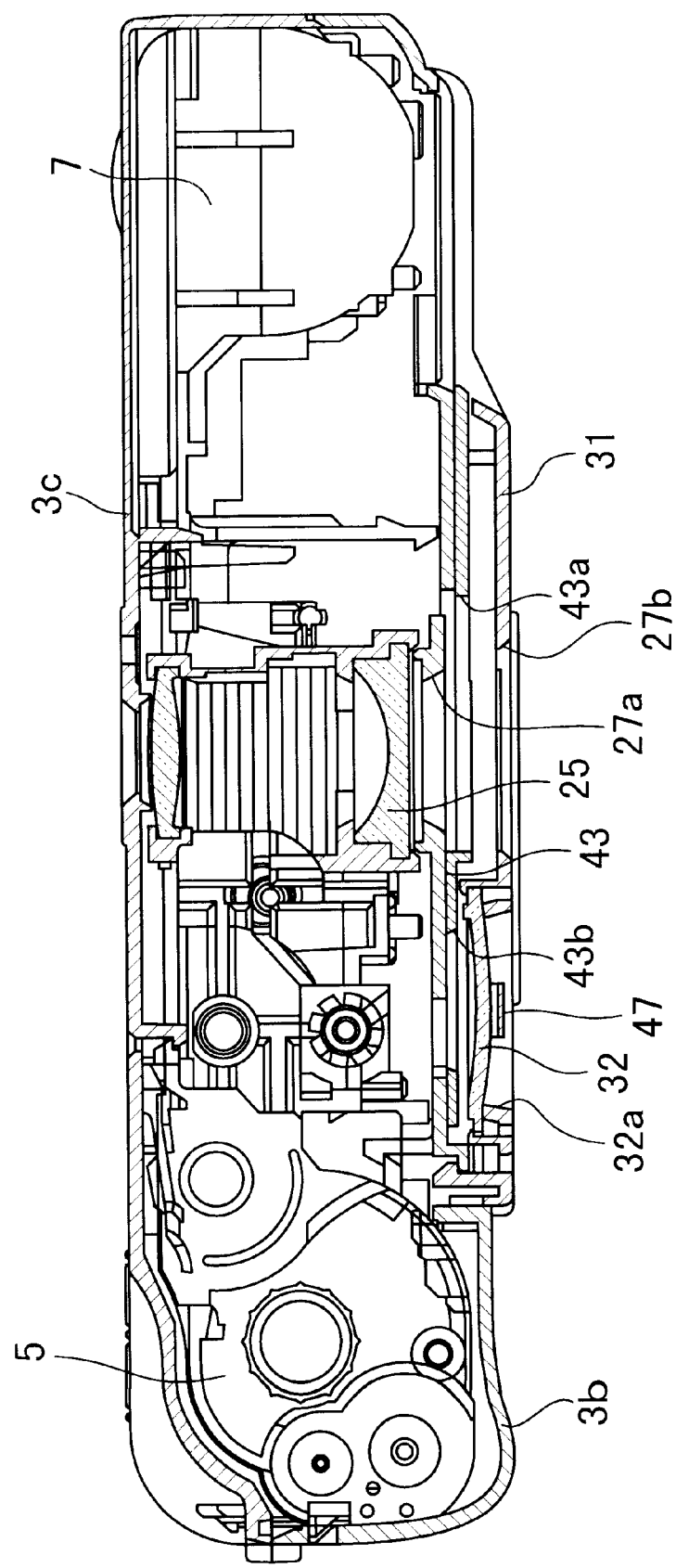
FIG. 10 is a horizontal sectional view of details of the finder portion according to the embodiment of FIG. 9.
Figure 11:
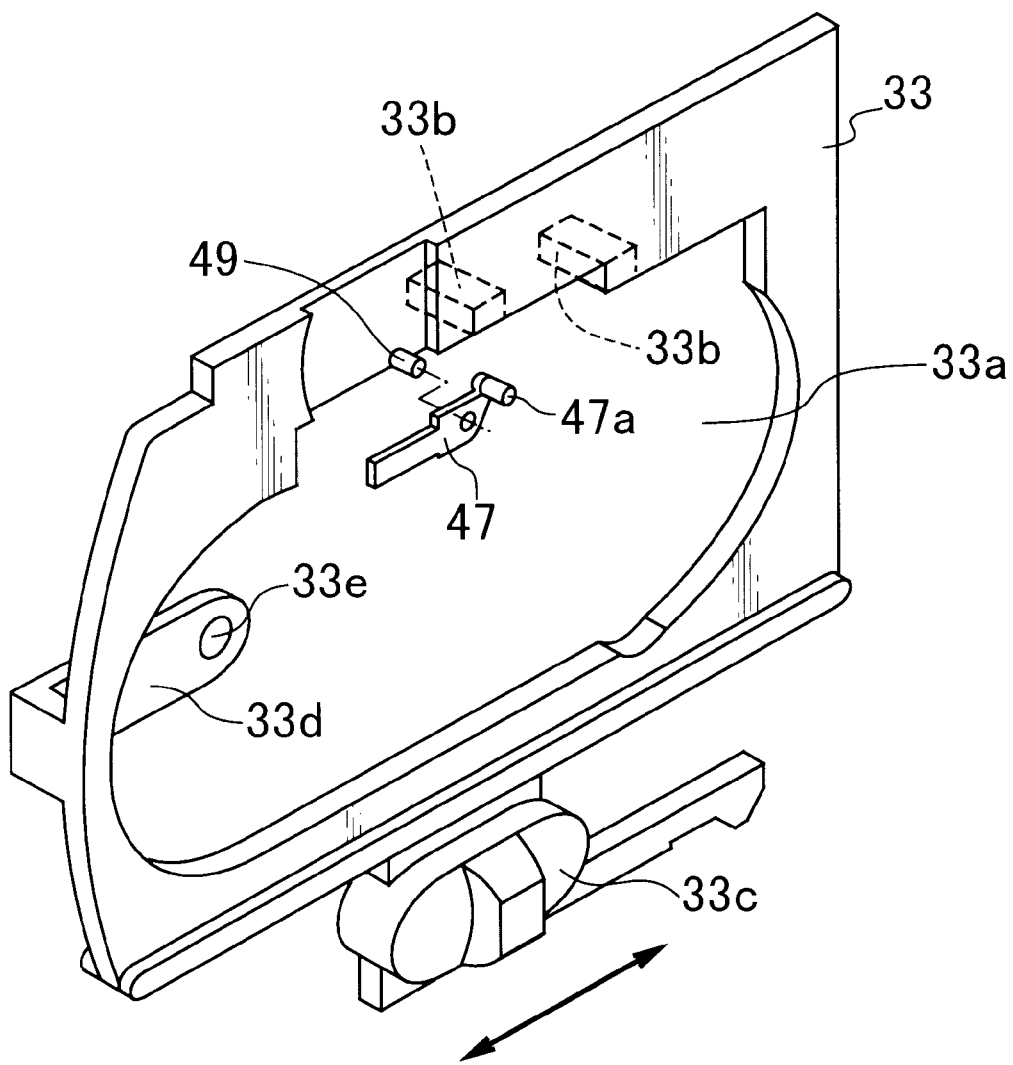
FIG. 11 is a perspective view of the selector member according to the embodiment of FIG. 9 and FIG. 10.

Other embodiments of this invention are illustrated in FIGS. 9 to 11. As shown in FIG. 11, in this structure an indication member 47 is installed on the upper front portion of the selector member 33, rotatably with a pin 49 as a mark for showing the state of normal photographing. This indication member 47 includes a pin 47a which protrudes forward and shifts sideways, as shown in FIG. 9, along the guide groove 51 in engagement with the guide groove 51 formed on the back side of the outer cover 31. The indication member 47 pivots around the pin 49 between the position shown by a solid line and the position shown by a phantom line when the selector member 33 shifts sideways in engagement with the guide groove 51. At the position for normal photographing that the selector member 33 shifts rightward facing the object, the indication member 47 protrudes frontward of the mirror 32 to indicate on the front of the unit that it is a normal photographing mode. Therefore, in case the photographer tries to take a photo of himself included in the photographing range, the photographer knows that the focusing of the unit is not proper for the photographing mode. At a close-up photographing position where the selector 33 shifts leftward facing the object, the indication member 47 retracts, as shown by a phantom line in FIG. 9, allowing to take a photo from the front of the unit. Also in this embodiment as in the above stated embodiment, a selector member 33 can be formed integrally with a finder frame 43 including a light-shielding member 43c. Instead of this indication member 47, a shielding member protruding upward may be mounted on the upper portion of the selector member 33, and when the selector member 33 is at the position for close-up photographing where the selecting member shifts leftward facing the object, the shielding member may be constituted between the finder window 27b and the mirror 32, to shield the whole part or part of the mirror 32.

Figure 12:
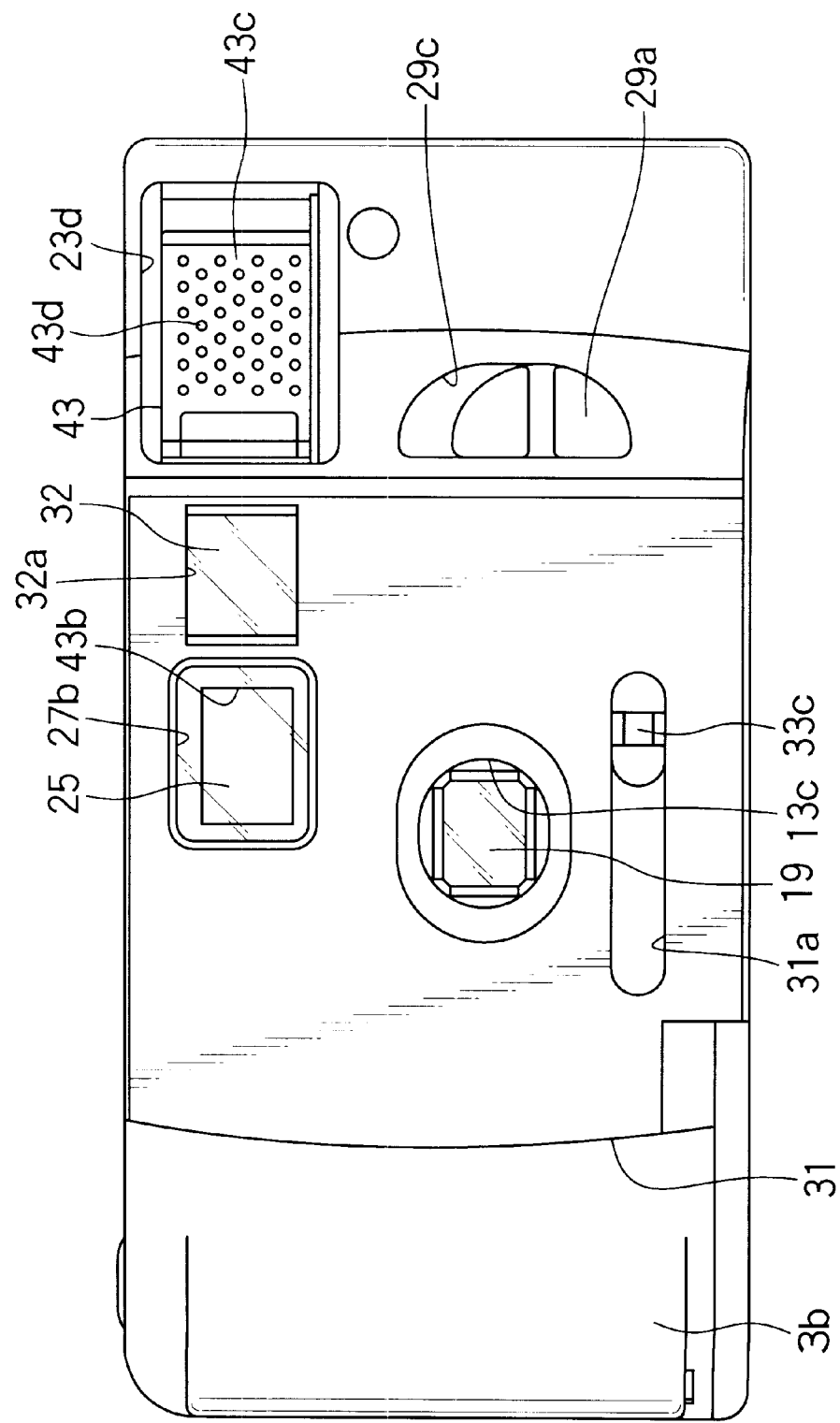
FIG. 12 is a front view of the lens-fitted film unit according to another embodiment of the invention.

In FIG. 12 is shown still another embodiment of this invention. For convenience of explanation, the corresponding parts are marked with the same signs. In this construction, the reflective mirror 32 is placed on the right side of the finder 27b facing the front of the unit. The illustrated position is the close-up position where the selector member 33 is shifted leftward facing the object, and the light-shielding member 43c formed integrally with the selector member 33 shields the light emitting portion. When the selector member 33 is shifted rightward facing the object, the light-shielding member 43c mounted on the selector member 33 shields the mirror 32. Therefore, the photographer knows that the focusing of the taking lens is improper for photographing himself included in the photographing range.

Figure 13:
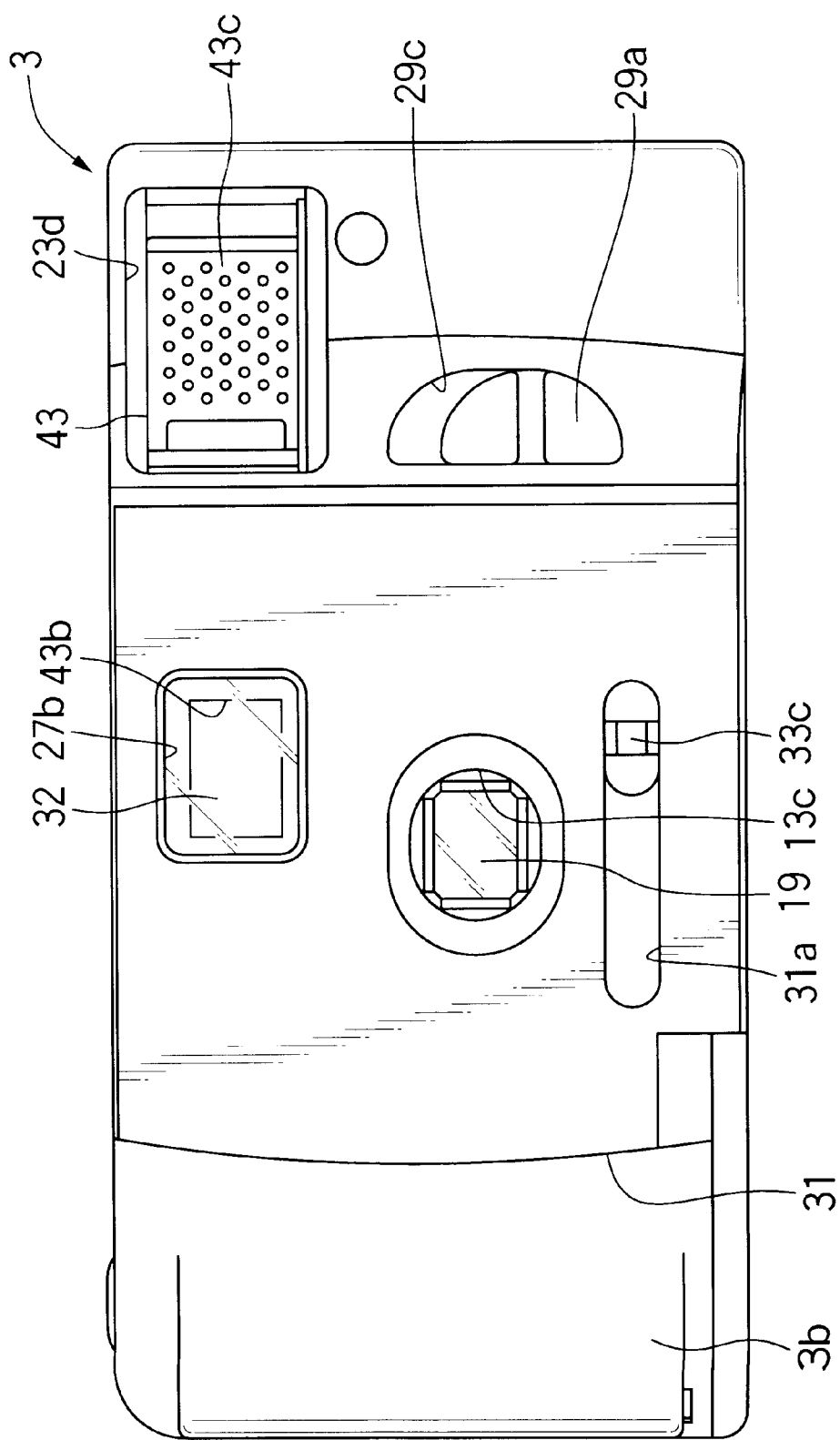
FIG. 13 is a front view of the lens-fitted film unit in the state of close-up photographing according to another embodiment of the invention.

Another embodiment of this invention is shown in FIG. 13. In this embodiment a finder window 27b overlapping the finder window 27a of the front cover 3b is formed on the outer cover 31 mounted on the front of the front cover 3b. As shown in FIG. 3 a half mirror 32 is fixed to the finder window 27b formed on the outer cover 31. This half mirror 32 is made up of a material vapor deposited by a reflective matter either on the front or on the back., and the ratio of reflection to translucence is to be 0:10 or 5:5. The outer cover 31 has a lens aperture 13c which receives front ends of the cylindrical lens holding member 13a and transmits light. A selector frame member 33 which can shift sideways is provided between the outer cover 31 and the front cover 3b.

Figure 14:
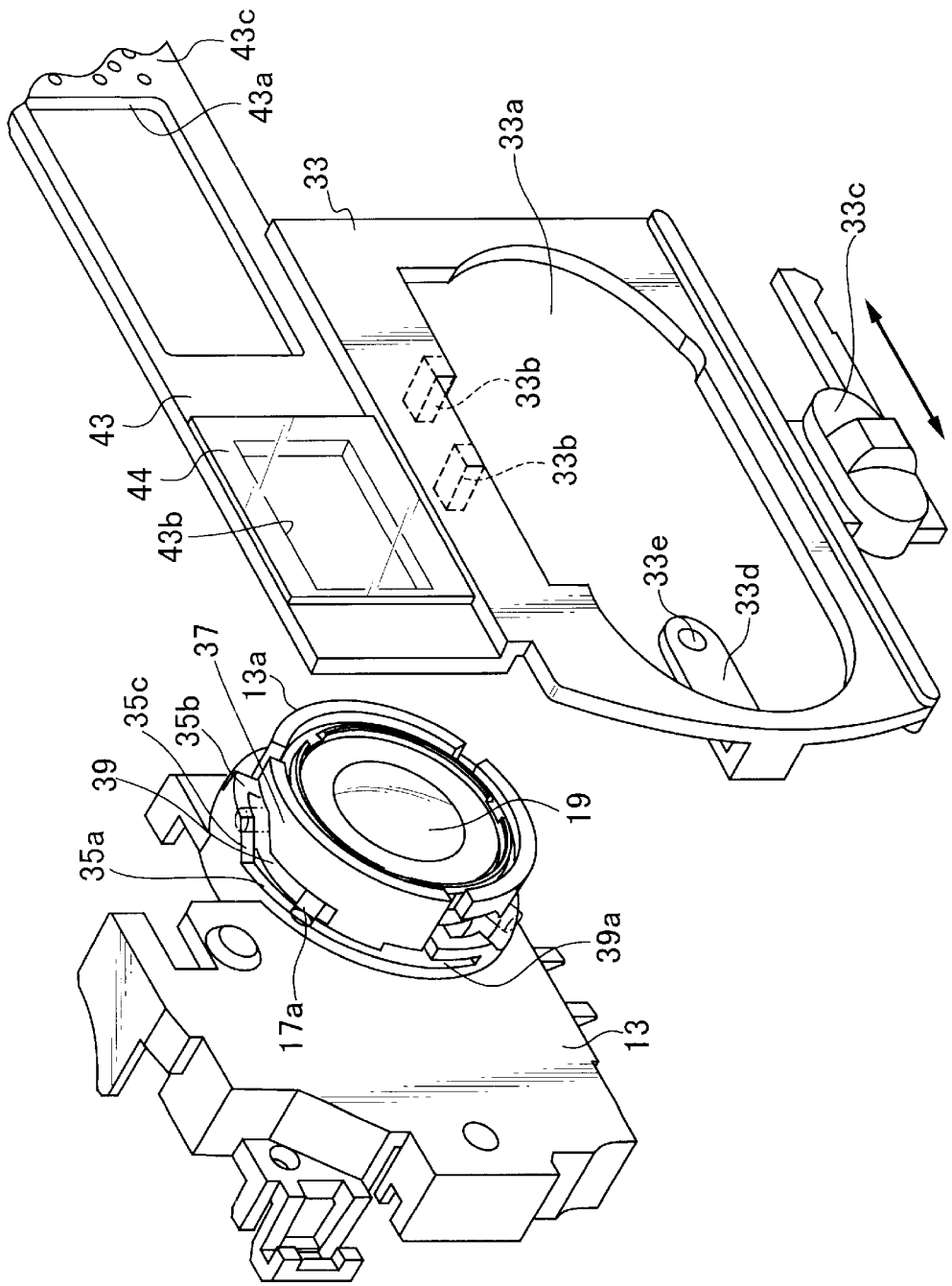
FIG. 14 is an exploded perspective of the focus position selective mechanism of the taking lens according to the embodiment of FIG. 13.
Figure 15:
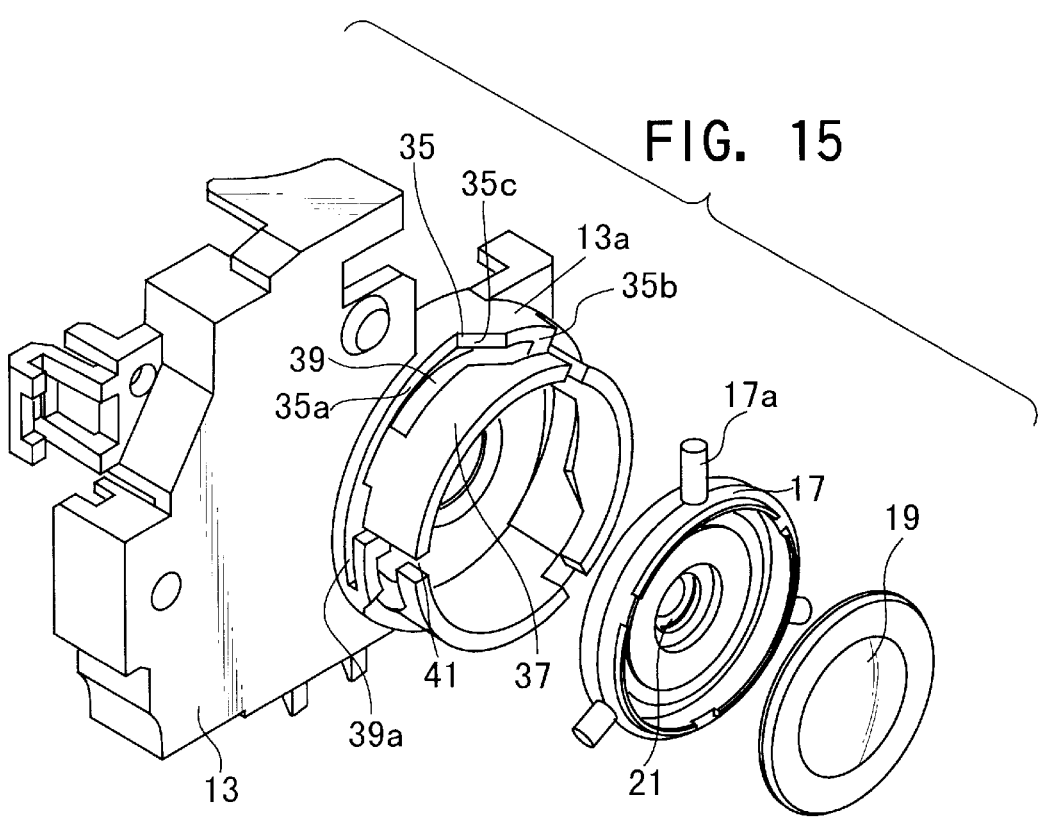
FIG. 15 is an exploded perspective of the arrangement of the selector member in the focus position selective mechanism according to the embodiment of FIG. 13.

In FIGS. 14 and 15 are shown details of a focusing position selection mechanism of the taking lens according to an embodiment of this invention. A cylindrical lens holding member 13a extending frontward from the lens holder 13 has a cam surface 35. In the illustrated mode this cam surface 35 consists of a first surface 35a to determine the retracting position of the lens 19, the second surface 35b to determine the protruding position of the lens 19, and the slanting portion 35c connecting the first surface 35a with the second surface 35b. The retainer is formed forward of the cam surface 35 at a stated interval. Therefore, the cam grooves are formed between the cam surface 35 and the retainer 37. The cam grooves are formed at a plurality of places (for example, three places) equally spaced on the circumference of the cylindrical lens holding member 13a. A groove 41 with a prescribed width is formed between one end of the retainer 37 consisting of a cam groove on the circumference and the adjacent end of the retainer 37 on the circumference.

A lens frame 17 consists of cam follower pins 17a at a plurality of places (for example, three pins equally spaced on the circumference, as illustrated) which protrude in the outward direction of the radius. These cam follower pins 17a are inserted into the cam grooves 39 through the groove 41. The retainer 37 of the cylindrical lens holding member 13 is elastic and it presses the cam follower pins 17a elastically to the cam surface 35. FIG. 5 illustrates a cam follower pin 17a in engagement with a cam groove 39.

As shown in FIG. 14, the selector member 33 is constituted as a frame member with an oblong aperture 33a in the midsection. The selector member 33 is provided between the outer cover 31 and the front cover 3b with the cylindrical lens holding member 13a inserted into the aperture 33a. The selector member 33 has a pair of lens driving pins 33b protruding backward, and the cam follower pins 17a on the lens frame 17 are sandwiched between these lens driving pins. In the lower portion of the selector member 33 is formed a selector knob 33c which protrudes, as shown in FIG. 13, forward of the slit 31a formed on the outer cover 31. Therefore, the selector member 33 can be shifted sideways by handling this selector knob 33c. When the selector member 33 shifts sideways, the lens driving pins 33b on the selector member rotate the lens frame 17 in engagement with lens follower pins 17*a* on the lens frame 17. Rotation of this lens frame 17 slides the cam follower pins on the cam surface 35, and the lens frame 13*a* is shifted by the cam action in the direction of the optical axis.

When the selector member 33 is set at the right side position facing the object, the cam follower pins 17*a* come into engagement with the first surface 35*a* of the cam surface 35, and when the cam follower pin 17*a* is at this position, the lens frame 17 and the taking lens 19 are positioned in the rear, and the taking lens 19 is positioned at a focal point for normal photographing, for example, of long distance of 4 m. Reversely, when the selector member 33 is set at the left side position facing the object, and the cam follower pin 17*a* is located on the second surface 35*b* of the cam surface 35, the lens frame 17 and the taking lens 19 are advanced to a focusing position for a short distance, for example, of 60 cm.

As shown in FIG. 14, on the right side of the selector member 33 facing the object is formed an aperture arm 33*d* extending sideways in the aperture 33*a* and on the tip of this aperture arm 33*d* is formed a second aperture 33*e*. The second aperture 33*e* has a smaller aperture than the first aperture 21 provided on the lens frame 17. When the selector member 33 is shifted leftward facing the object, and the taking lens 19 is protruded frontward, the aperture arm 33*d* of the selector member 33 is inserted into a rear position of the taking lens through the slit 39*a* formed in the cylindrical lens holding member 13*a*. Then the second aperture 33*e* at the tip of the aperture 33*d* is positioned on the axis of the taking lens 19. As a result, the aperture for photographing becomes smaller than the first aperture, and the depth of focus becomes greater, resulting in avoidance of out-of-focus condition.

In the illustrated embodiment of this invention, as shown in FIG. 14, a finder frame 43 is formed integrally with the selector member 33 in its upper portion. The finder frame 43 has, approximately in the midsection sideways, an aperture 43*a* which is located at a position overlapping the finder window 27 of the base portion 3*a* of the main body 3. The close-up field frame 43*b* for showing the close-up photographing field is formed on the right side of the aperture 43*a* facing the object. In this embodiment of the present invention, as shown in FIG. 14, a dimmer member 44 such as an ND filter is fixedly provided in the close-up field frame 43*b* of the finder frame 43.

On the opposite side of the close-up field frame 43*b*, the light-shielding member 43*c* is located with the aperture 43*a* in-between. This finder frame 43 shifts sideways along the front of the front cover 3*b* between the front cover 3*b* of the main body 3 and the outer cover 31 in response to the sideway shifting of the selector member 33.

When the selector member 33 is at the normal photographing position, the aperture 43*a* of the finder frame 43 overlaps the finder 27*a* of the front cover 3*b*, the photographer can determine the composition by observing the object through the half mirror 32 fixed to the finder window 27*b* of the eyepiece and the outer cover 31. Then the light-shielding member 43*c* of the finder frame 43 is located between the light emitting portion 23*a* and the finder window 27, with the light emitting portion wholly exposed frontward. The dimmer 44 fixedly provided to the close-up field frame 43*b* of the finder frame 43 and the close-up field frame, is located at a retracted position sideways from the finder window 27. Therefore, the light coming from the object through the photographing field finder can not be shielded, permitting to observe the object with a sufficient brightness.

When the selector 33 is shifted leftward facing the object, the taking lens is protruded frontward to be ready for the close-up photographing as stated previously, and at the same time the finder frame 43 shifts in the same direction, leading to the state shown in FIG. 13. At this position, the close-up field 43*b* is located inside of the finder window 27*b*, which allows the photographer to observe the photographing range through this close-up field frame 43*b*. At the same time the dimmer member 44 fixedly provided to the close-up field frame 43*b*, is inserted in the back side of the half mirror fixedly provided with the front of the finder window 27, and so the brightness in the back of the half mirror decreases, leading to a greater dummy reflectance when seen from the front. Therefore, in case the photographer tries to take a photo of himself included in the photographing range, it can be confirmed via the half mirror 32 from the front of the lens-fitted Film Unit 1. In case the half mirror is used as a reflective mirror like this, it is preferable that the fixing position, the fixing angle and the shape of the half mirror 32 are determined such that the parallax can be compensated. At this close-up photographing position, the light-shielding member 43*c* formed in the finder frame 43 is located in the front portion of the stroboscope window 23*d*, and so the light emitting portion 23*a* is overlapped, and the light from the stroboscope is given forward only through the both sides of the light-shielding member 43*c* so that the amount of light of the stroboscope is limited. Therefore, overexposure in close-up photographing can be avoided by this structure. Further, the light-shielding member 43*c* may be constituted such that pinholes are provided instead of overlapping part of the stroboscope window 23*d* by the light-shielding member.

The foregoing detailed description has been given in regard to embodiments of the present invention applied to the finder system of the lens-fitted film unit with an unexposed film previously loaded into the unit in the process of manufacture. This invention can also be applied to such types of photo cameras that users load photo films by themselves.

As is evident from the previous description, according to this invention, it is possible to obtain a finder apparatus for photographing with a plurality of focusing positions permitting a photographer to take a photo of himself situated in front as part of the object. According to an aspect of this invention, in the case of taking a self-portrait of a photographer from the front of the apparatus as part of the object and a focal point is not proper for the photographing, the photographer can learn from the front of the apparatus to that effect, allowing to decrease the possibility of taking out-of-focus photos.

What is claimed is:

1. A lens-fitted film unit including a photographing mechanism with a fixed-focus taking lens and a shutter in a main body, said body being formed with a cartridge chamber for storing a cartridge with a rotatable spool shaft retaining an end of a film, and a film roll chamber for storing a roll of unexposed film drawn out from the cartridge, said cartridge chamber and said film roll chamber being loaded during manufacture with a cartridge and a roll of unexposed film drawn out of said cartridge, respectively, whereby each time a picture is taken, the spool shaft is rotated to take up an exposed film portion into the cartridge, comprising;

a selector member which is adapted to selectively determine a focusing position of the taking lens at either a predetermined normal photographing position or a close-up photographing position, a photographing field finder, a reflective mirror fixedly provided adjacent to the photographing field finder for making it possible for a photographer to observe a photographing field from the front side of the unit during a close-up photographing;

a light emitting portion disposed in a front portion of the main body, and a light-shielding member provided integrally with the selector member, for restricting the amount of light from the light emitting portion by shielding at least part of a front portion of the light emitting portion when the selector member is in the close-up photographing position, wherein the light-shielding member shields at least part of the reflective mirror when the selector member is at the normal photographing position.

2. A lens-fitted film unit including a photographing mechanism with a fixed-focus taking lens and a shutter in a main body, said body being formed with a cartridge chamber for storing a cartridge with a rotatable spool shaft retaining an end of a film, and a film roll chamber for storing a roll of unexposed film drawn out from the cartridge, said cartridge chamber and said film roll chamber being loaded during manufacture with a cartridge and a roll of unexposed film drawn out of said cartridge, respectively, whereby each time a picture is taken, the spool shaft is rotated to take up an exposed film portion into the cartridge, comprising;

a selector member which is adapted to selectively determine a focusing position of the taking lens at either a predetermined normal photographing position or a close-up photographing position, a photographing field finder, and a reflective mirror fixedly provided adjacent to the photographing field finder for making it possible for a photographer to observe a photographing field from the front side of the unit during a close-up photographing, wherein said selector member is integrally provided with a close-up field frame which is adapted to be placed over the photographing field finder when said selector member is in said close-up photographing position to indicate an area of the close-up photographing to thereby compensate for the parallax, said close-up field frame being adapted to be placed over the reflective mirror to indicate toward the front direction of the unit that the unit is in the normal photographing position when the selector member is at the normal photographing position.

3. A photo camera comprising a fixed-focus taking lens, a photographing mechanism including a shutter mechanism, a selector member for locating the taking lens selecting at one of a plurality of focusing positions including a close-up photographing position and a normal photographing position, and a photographing field finder, said camera further comprising;

a reflective mirror fixedly provided in the proximity of said photographing field finder for permitting to observe the photographing field from the front at the close-up photographing, a mirror-shielding member formed integrally with the selector member and adapted to be retracted from a position in front of the reflective mirror for permitting to observe the photographing field by the reflective mirror when the selector member is at the close-up photographing position, and to cover the reflective mirror when the selector member is at the normal photographing position, a light emitting portion disposed in a front portion of the main body, and a light-shielding member disposed integrally with the selector member, for restricting the amount of light from the light emitting portion by shielding at least part of the front portion of the light emitting portion when the selector member is at the close-up photographing position, wherein the light-shielding member shields at least part of the reflective mirror when the selector member is at the normal photographing position.

4. A photo camera comprising a fixed-focus taking lens, a photographing mechanism including a shutter mechanism, and a selector member for locating the taking lens selecting at one of a plurality of focusing positions including a close-up photographing position and a normal photographing position, said camera further comprising;

a reflective mirror fixedly provided on a side of a photographing field finder for permitting to observe the photographing field from the front of the unit at the close-up photographing, and a close-up field frame provided integrally with the selector member, overlapping the photographing field finder to show an area of the close-up photographing when the selector member is at the close-up photographing position, and overlapping the reflective mirror to indicate toward the front that the camera is in the normal photographing mode when the selector member is at the normal photographing position.

5. A lens-fitted film unit including a photographing mechanism with a shutter in the main body, said body being formed with a cartridge chamber for storing a cartridge with a rotatable spool shaft retaining an end of a film, and a film roll chamber for storing a roll of unexposed film drawn out from the cartridge, the cartridge chamber and the film roll chamber being loaded during manufacture with a cartridge and a roll of unexposed film drawn out from said cartridge, respectively, whereby each time a picture is taken, the spool shaft is rotated to take up an exposed film portion into the cartridge, comprising;

a cylindrical lens holding member fixedly provided on the main body, a lens frame with a taking lens fixed thereto provided in the cylindrical lens holding member for rotation and an axial movement in the direction of an optical axis, a cam mechanism provided between the cylindrical lens holding member and the lens frame, a selector member provided in the main body of the camera for movement between a predetermined normal photographing position and a close-up photographing position, the movement of said selector member causing the lens frame to rotate to thereby cause the lens frame to move in the direction of the optical axis by the action of the cam mechanism, a photographing field finder for defining a photographing field frame, a translucent member fixedly provided in a front portion of the photographing field finder, for transmitting at least part of light from an object through the finder toward the back side of the unit for making it possible to observe said object though the finder, and a dimmer member provided movably with respect to the photographing field frame, said dimmer member being adapted to decrease brightness of background of the translucent member to facilitate observation of the photographing field frame from a front side of the unit by the reflection of the translucent member when the selector member is at the close-up photographing position.

6. A photo camera provided with a fixed-focus taking lens, a photographing mechanism including a shutter mechanism, a selector member for selectively locating the taking lens at one of a plurality of focusing positions including a close-up photographing position and a normal photographing position, and a photographing field finder defining a photographing field frame, comprising;

a translucent member fixedly provided in a front portion of the photographing field finder for transmitting at least part of light from an object through the finder toward backside of the unit for making it possible to observe said object though the finder, and a dimmer member provided movably with respect to the photographing field frame, said dimmer member being adapted to decrease brightness of background of the translucent member to facilitate observation of the photographing field frame from a front side of the unit when the selector member is at the close-up photographing position.

7. A lens-fitted film unit including a photographing mechanism with a fixed-focus taking lens and a shutter in the main body, the body being formed with a cartridge chamber for storing a cartridge with a rotatable spool shaft retaining an end of a film, and a film roll chamber for storing a roll of unexposed film drawn out from the cartridge, the cartridge chamber and the film roll chamber being loaded during manufacture with a cartridge and a roll of unexposed film roll drawn out from the cartridge, respectively, whereby each time a picture is taken, the spool shaft is rotated to take up an exposed film portion into the cartridge, comprising;

a selector member which is adapted to locate the taking lens selectively at one of focused positions for a predetermined normal photographing position and a close-up photographing position, a photographing field finder for defining a photographing field frame, a translucent member which is fixedly provided in a front portion of the photographing field finder, for transmitting at least part of light from an object through the finder toward back side of the unit for making it possible to observe said object through the finder, and a dimmer member provided movably with respect to the photographing field frame, said dimmer member being adapted to decrease brightness of background of the translucent member to facilitate observation of the photographing field frame from a front side of the unit by the reflection of the translucent member when the selector member is at the close-up photographing position.

8. A lens-fitted film unit or a photo camera as set forth in claim 7, wherein;

the translucent member is made from a half mirror with reflectance of 50% or less, or a translucent material with reflectance of approximately 0%.

9. A lens-fitted film unit or a photo camera as set forth in claim 7, wherein;

said selector member is integrally provided with a close-up field frame which is adapted to be placed over the photographing field finder to indicate an area of the close-up photographing when the selector is at the close-up photographing position to thereby compensate for parallax, and, the dimmer member is provided in the close-up field frame.

10. A lens-fitted film unit or a photo camera as set forth in claim 7, wherein;

the dimmer member has such a translucence that permits to observe the object from the back of the unit through the finder.

11. A lens-fitted film unit or a photo camera as set forth in claim 7, wherein;

a light emitting portion is provided in a front portion of the main body, and a light-shielding member is provided integrally with the selector member, for restricting amount of light from the light emitting portion by shielding at least part of the front portion of the light emitting portion when the selector member is at the close-up photographing position.

* * * * *